(12) United States Patent
Jang et al.

(10) Patent No.: US 10,082,659 B2
(45) Date of Patent: Sep. 25, 2018

(54) MICROSCOPE (71) Applicant: GWANGJU INSTITUTE OF SCIENCE AND TECHNOLOGY, Gwangju (KR)

(72) Inventors: Hwanchol Jang, Gwangju (KR); Heung-No Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 174 days.

(21) Appl. No.: 15/166,278

(22) Filed: May 27, 2016

(65) Prior Publication Data
US 2016/0357001 A1 Dec. 8, 2016

(30) Foreign Application Priority Data
May 28, 2015 (KR) ........................ 10-2015-0075286

(51) Int. Cl.
*G02B 21/06* (2006.01)
*G02B 21/36* (2006.01)
(Continued)

(52) U.S. Cl.
CPC ........... *G02B 21/06* (2013.01); *G02B 5/0242* (2013.01); *G02B 21/361* (2013.01); *G06K 9/00134* (2013.01); *G06K 9/20* (2013.01)

(58) Field of Classification Search
CPC .................................. A61B 1/07; G02B 21/06
See application file for complete search history.

(56) References Cited

U.S. PATENT DOCUMENTS 4,273,419 A * 6/1981 Geary .................. G01N 21/255
356/432
6,927,859 B2 * 8/2005 Kwok ................ G01N 21/5911
250/559.02
(Continued)

FOREIGN PATENT DOCUMENTS

KR 101423964 B1 7/2014

OTHER PUBLICATIONS

Michal Aharon et al., "K-SVD: An Algorithm for Designing Overcomplete Dictionaries for Sparse Representation", IEEE Transactions on Signal Processing, vol. 54, No. 11, Nov. 2006, 12 pages.
(Continued)

*Primary Examiner* — James Pontius
(74) *Attorney, Agent, or Firm* — Hauptman Ham, LLP (57) ABSTRACT Disclosed herein is a microscope. The microscope includes: a lens system receiving light emitted from a light source and containing image information of an observation object; turbid media interposed between the observation object and the lens system; and an image acquisition device acquiring the image information, wherein the image acquisition device comprises: an image sensor acquiring information of light passing through the lens system; a transmission matrix storage unit previously storing a transmission matrix indicating a transmission state of various light components entering the light entrance portion; and an image recovery unit recovering the image information from the information of light acquired by the image sensor through compressed sensing using a sparse representation based on the transmission matrix. The microscope can provide improved image quality and can acquire an image through simple operation.

10 Claims, 8 Drawing Sheets

(51) Int. Cl.
*G02B 5/02* (2006.01)
*G06K 9/00* (2006.01)
*G06K 9/20* (2006.01)

(56) References Cited

U.S. PATENT DOCUMENTS

| | | | | |
|---|---|---|---|---|
| 7,894,071 | B2* | 2/2011 | Frese | B01L 3/5027 356/440 |
| 8,675,195 | B2* | 3/2014 | Ihlefeld | G01N 15/0205 356/335 |
| 9,007,696 | B2* | 4/2015 | Petersen | A61B 5/0066 359/642 |
| 9,612,186 | B2* | 4/2017 | Wei | G01N 15/0227 |
| 2010/0253949 | A1* | 10/2010 | Adler | A61B 5/0066 356/479 |
| 2011/0304745 | A1* | 12/2011 | Wang | G06T 15/50 348/229.1 |
| 2013/0271592 | A1* | 10/2013 | Piestun | H04N 7/18 348/79 |
| 2014/0240532 | A1* | 8/2014 | Marwah | H04N 5/2621 348/222.1 |
| 2015/0015879 | A1* | 1/2015 | Papadopoulos | G02B 23/26 356/301 |
| 2016/0202165 | A1* | 7/2016 | Wei | G02B 21/0092 356/336 |
| 2016/0258817 | A1* | 9/2016 | Dholakia | G01J 3/0205 |
| 2016/0299033 | A1* | 10/2016 | Choi | G01N 21/59 |
| 2017/0176660 | A1* | 6/2017 | Mirsepassi | G02B 5/021 |

OTHER PUBLICATIONS

Emmanuel J. Candes et al., "Near-Optimal Signal Recovery From Random Projections: Universal Encoding Strategies?", IEEE Transactions on Information Theory, vol. 52, No. 12, Dec. 2006, 20 pages.

S.M. Popoff et al., "Measuring the Transmission Matrix in Optics: An Approach to the Study and Control of Light Propagation in Disordered Media", Physical Review Letters, Mar. 12, 2010, 4 pages.

Choi, Youngwoon et al., "Overcoming the Diffraction Limit Using Multiple Light Scattering in a Highly Disordered Medium.", Physical Review Letters 107 (2011)., 2011 American Physical Society, 5 pages.

[Supportive Materials for Exception to Loss of Novelty] Hwanchol Jang et al., "Speckle suppression via sparse representation for wide-field imaging through turbid media", Optics Express 16619, Jun. 30, 2014, vol. 22, No. 13, 10 pages.

[Supportive Materials for Exception to Loss of Novelty] Antoine Liutkus et al., "Imaging With Nature: Compressive Imaging Using a Multiply Scattering Medium", Scientific Reports, vol. 4:5552, published Jul. 9, 2014, 7 pages.

[Supportive Materials for Exception to Loss of Novelty] Hwanchol Jang et al., "Recent Progress in Computational Imaging Through Turbid Media", The Journal of Korean Institute of Communications and Information Sciences, Dec. 2014 vol. 39A No. 12, 7 pages.

[Supportive Materials for Exception to Loss of Novelty] Hwanchol Jang et al., "Holistic random encoding for imaging through multimode fibers", Optics Express 6705, vol. 23, No. 5, Mar. 9, 2015, 17 pages.

* cited by examiner

MICROSCOPE

CROSS REFERENCE TO RELATED APPLICATION

This application claims the benefit of Korean Patent Application No. 10-2015-0075286, filed on May 28, 2015, entitled "MICROSCOPE", which is hereby incorporated by reference in its entirety into this application.

BACKGROUND

1. Technical Field

The present invention relates to a microscope.

2. Description of the Related Art

In observation of an object such as a living tissue under a microscope, an output light wave passing through turbid media undergoes multiple scattering and is thus completely different in shape from an input light wave. Thus, it has been thought that transmission of light waves through turbid media must be avoided in imaging of a living tissue.

However, it was confirmed through Non-Patent Document 1 that scrambling due to multiple scattering in turbid media and a resulting speckle pattern are deterministic, and it is thus possible to recover an input light wave before passing through turbid media so long as such a scrambling action can be understood. Non-Patent Document 1 discloses a method in which transmission matrices indicating states of optical signals containing image information before/after passing through turbid media are calculated, followed by inversion of the transmission matrices with respect to an output light wave to compensate for scattering, thereby reconstructing an image.

In Non-Patent Document 1, test results show that turbid media can improve spatial resolution of a typical optical system beyond a diffraction limit thereof.

However, an imaging system using turbid media has a problem in that the system requires measurement and processing of a lot of data. Specifically, in order to measure transmission matrices, response to a large number of base input light waves must be measured in advance. In addition, when inversion of the transmission matrix is performed once, it is impossible to provide a high quality image due to noise or errors in the transmission matrix, causing lots of speckles to remain in a reconstructed image. In order to solve this problem, it is necessary to average images recovered from a large number of incoherent samples. For example, in Non-Patent Document 2, responses to 20,000 base input light waves are measured to calculate a transmission matrix and 1,000 incoherent samples are used in image averaging.

As such, the above imaging system requires measurement of lots of data, causing increase in computational complexity, memory use, and time complexity.

PRIOR ART DOCUMENTS

Non-Patent Document

Non-Patent Document 1: S. M. Popoff, G. Lerosey, R. Carminati, M. Fink, A. C. Boccara, and S. Gigan, "Measuring the transmission matrix in optics: an approach to the study and control of light propagation in disordered media," Phys. Rev. Lett., vol. 104, no. 10, 100601, March 2010.

Non-Patent Document 2: Y. Choi, M. Kim, C. Yoon, T. D. Yang, K. J. Lee, and W. Choi, "Overcoming the diffraction limit using multiple light scattering in a highly disordered medium," Phys. Rev. Lett., vol. 107, no. 2, 023902, July 2011.

BRIEF SUMMARY

Embodiments of the present invention have been conceived to solve such a problem in the art and it is one aspect of the present invention to provide a microscope which can reduce computational complexity, memory use and time complexity, and thus can be easy to use.

It is another aspect of the present invention to provide a microscope which can increase a numerical aperture by providing turbid media at a light entrance portion of the microscope such that a wider variety of information can be used in recovery of an image, thereby providing further improved image quality.

In accordance with one aspect of the present invention, a microscope includes: a lens system receiving light emitted from a light source and containing image information of an observation object; turbid media interposed between the observation object and the lens system; and an image acquisition device acquiring the image information, wherein the image acquisition device includes: an image sensor acquiring information of light passing through the lens system; a transmission matrix storage unit previously storing a transmission matrix indicating a transmission state of various light components entering the light entrance portion; and an image recovery unit recovering the image information from the information of light acquired by the image sensor through compressed sensing using a sparse representation based on the transmission matrix.

The light source may be a coherent light source, preferably an infrared laser. A beam splitter may be disposed between the image acquisition device and the lens system, and the beam splitter may allow both a signal beam passing through the lens system and a reference beam emitted from the light source to be transmitted to the image sensor. The turbid media may be obtained by incorporating nanoscale fine particles into a transparent matrix. Here, the fine particles may be formed of ZnO. The turbid media may be deposited on a slide glass. Columns of the transmission matrix may be calculated at different light incident angles.

In accordance with another aspect of the present invention, a microscope includes: a lens system; turbid media interposed between the lens system and an observation object; and an image acquisition device acquiring an image of the observation object from light passing through the lens system, wherein the image acquisition device includes: an image sensor acquiring information of light passing through the lens system; a transmission matrix storage unit previously storing a transmission matrix indicating a transmission state of light components passing through the lens system at different incident angles; and an image recovery unit recovering an image of the observation object from the information of light acquired by the image sensor through compressed sensing using a sparse representation based on the transmission matrix.

The present invention can provide a microscope that can secure improved image quality and can acquire an image through simple operation.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Exemplary embodiments of the present invention will now be described in detail with reference to the accompanying drawings. However, it should be understood that these embodiments are not to be construed in any way as limiting the present invention and that various modifications, changes, alterations, and equivalent embodiments can be made by those skilled in the art without departing from the spirit and scope of the invention.

It should be noted that the accompanying drawings are not to precise scale and may be exaggerated or reduced in optical paths for descriptive convenience and clarity only, a path of light can be shown. However, functions and operations of components can be sufficiently understood.

Figure 1:
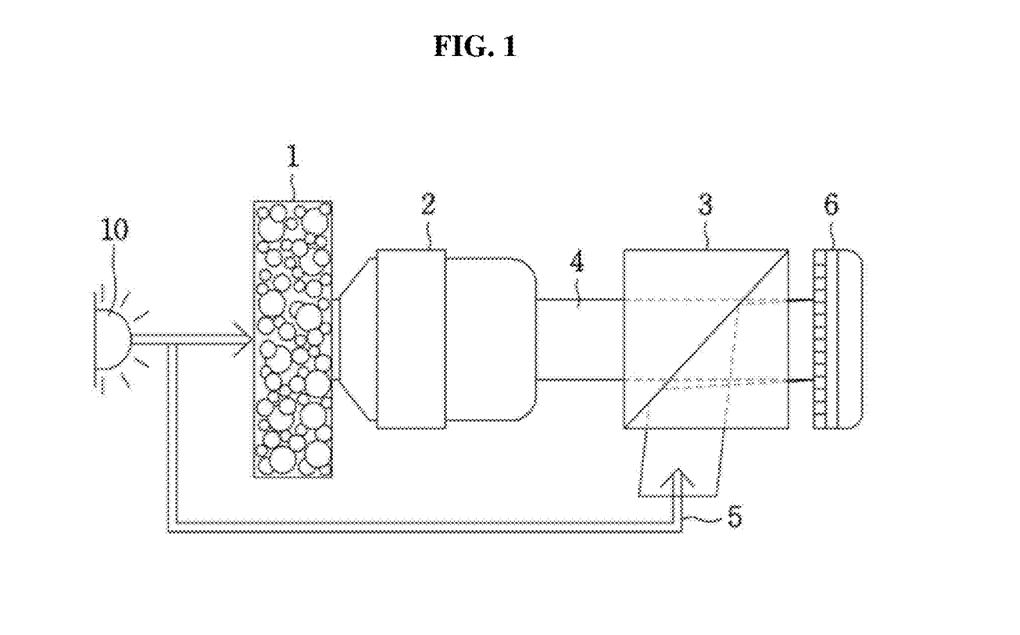
FIG. 1 is a schematic view of a microscope according to an exemplary embodiment of the present invention.

FIG. 1 is a schematic view of a microscope according to an exemplary embodiment of the present invention.

Referring to FIG. 1, the microscope according to the exemplary embodiment of the present invention includes a lens system 2, turbid media 1 provided to a light entrance portion of the lens system 2, a beam splitter 3 provided to a light exit portion of the lens system 2, and an image acquisition device 6 provided to an exit side of the beam splitter 3.

The turbid media 1 may include fine particles incorporated into a matrix of a transparent resin capable of transmitting light. The turbid media 1 may be applied to the light entrance portion of the lens system 2 or may be provided as a separate plate. As the fine particles, nanoscale zinc oxide (ZnO) may be used. An inherent numerical aperture (NA) of the lens system can be increased by providing the turbid media 1 at the light entrance portion of the lens system. In other words, light is scattered in many directions within the turbid media 1, whereby an angle at which light can enter through the light entrance portion of the lens system 2 can be widened. For example, light beams that are incident at an angle that would not otherwise allow entry into the lens system 2 can change travel direction due to the presence of the fine particles to be transmitted into the into the lens system 2.

The beam splitter 3 allows acquisition of both a signal beam 4 passing through the turbid media 1 and a reference beam 5 bypassed from an original light source 10. The microscope may further include a beam splitter bypassing a portion of light emitted from the light source 10 so as to acquire the reference beam 5. A process of recovering a phase signal by introducing the signal beam and the reference beam into the beam splitter 4 may be referred to as a holographic process. By employing the holographic process, the image acquisition device 6 can recover an image signal more accurately using an intensity signal of the signal beam and the phase signal of the signal beam, which is obtained by referring to the signal beam and the reference beam.

Next, operations and effects of the microscope will be described briefly.

In the microscope according to this embodiment of the invention, light emitted from the light source 10 towards the light entrance portion of the lens system passes through an observation object and the turbid media 1 and then enters the lens system 2. As described above, the turbid media 1 serve to increase a numerical aperture (NA) of the light entrance portion. Optical signals transmitted through the lens system 2 enter the beam splitter 3 as the signal beam 4. The beam splitter 3 receives both the signal beam 4 and the reference beam 5. The reference beam 5 refers to a light beam that is transmitted using another beam splitter or the like without any change after being emitted from the light source 10. The image acquisition device 6 may acquire a phase signal of the signal beam 4 using the reference beam 5 while acquiring an intensity signal of the signal beam 4. The image acquisition device 6 recovers an image using both the intensity signal and the phase signal, whereby a more accurate image can be obtained.

Figure 2:
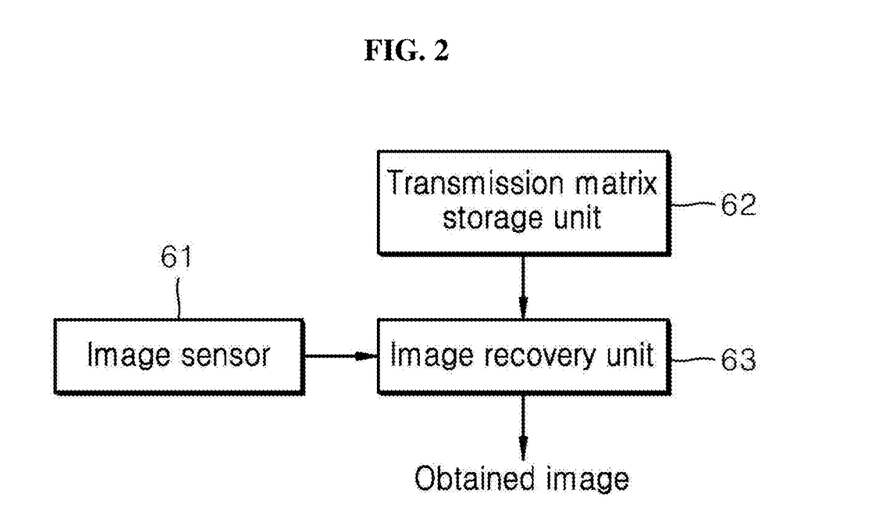
FIG. 2 is a block diagram of an image acquisition device.

FIG. 2 is a block diagram of the image acquisition device.

Referring to FIG. 2, the image acquisition device 6 includes an image sensor 61 acquiring both the signal beam 4 and the reference beam 5 passing through the beam splitter 3, a transmission matrix storage unit 62, and an image recovery unit 63 recovering an image of an observation object using a transmission matrix stored in the transmission matrix storage unit 62 and an image acquired by the image sensor 61.

Next, the transmission matrix (TM) stored in the transmission matrix storage 62 will be described in more detail. The transmission matrix may indicate what image is formed by light incident in many different directions at many different positions toward the light entrance portion and passing through the turbid media 1, the lens system 2, and the beam splitter 3. The transmission matrix may be discerned before market release of the microscope. Since the transmission matrix may vary depending upon in what manner fine particles are dispersed in the turbid media 1, the transmission matrix may be measured differently for each microscope. For example, the number of columns of the transmission matrix stored in the transmission matrix storage unit 72 may reach several thousand.

The image recovery unit 63 recovers an image though compressed sensing (CS), wherein the transmission matrix stored in the transmission matrix storage unit 62 and the image acquired by the image sensor 61 are used.

Figure 3:
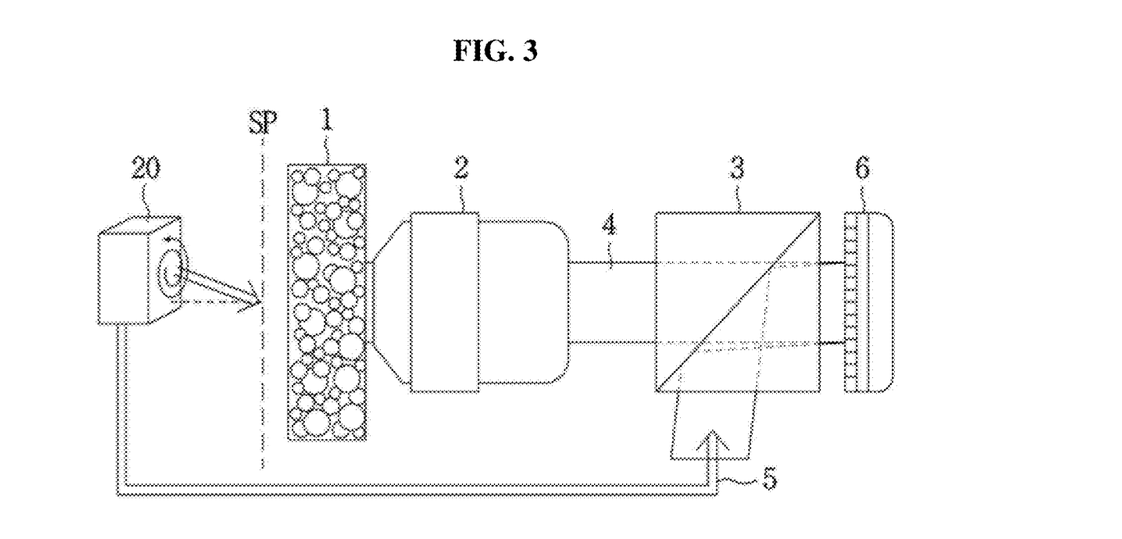
FIG. 3 is a view illustrating a method of measuring a transmission matrix.

FIG. 3 is a view illustrating a method of measuring the transmission matrix.

Referring to FIG. 3, a multi-directional lamp 20 emits light toward the light entrance portion of the microscope, more precisely the turbid media 1, in various directions at various positions. The multidirectional lamp 20 is capable of emitting laser beams at thousands of angles and thousands of positions in dozens of seconds. By way of example, the transmission matrices may be measured while gradually increasing the distance and angle from the center of the turbid media 1, starting at the center. Each of the transmission matrices may indicate what image is formed in the image sensor 61 by light incident at a certain angle and position and passing through the turbid media 1.

Next, the meaning of the transmission matrix will be described with reference to Equation 1:

$$o(x, y) = \sum_{k_x} \sum_{k_y} a(k_x, k_y) p(x, y; k_x, k_y)$$

where o(x,y) is an object wave; a($k_x$, $k_y$) is an angular spectrum of the object wave (wherein k is a wave vector); and P(x, y; $k_x$, $k_y$) is a plane wave having k propagation directions. Thus, the object wave denotes light entering the turbid media 1 and may be divided into a set of plane waves having k propagation directions.

Figure 5:
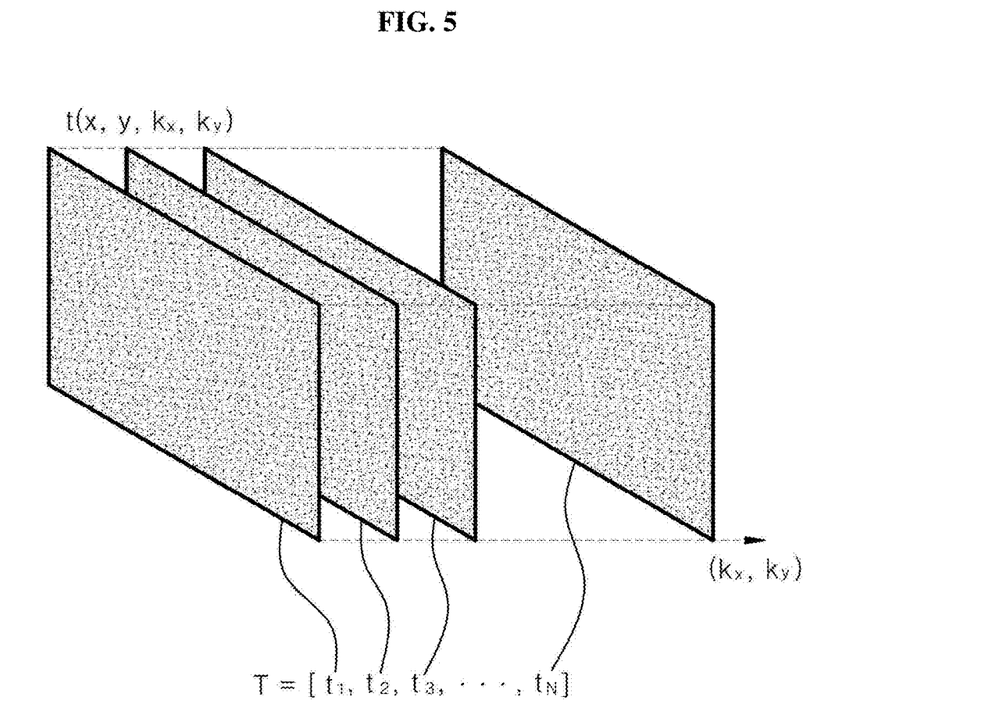
FIG. 5 is a view of the transmission matrix.

When the object wave passes through the turbid media 1 and the lens system 2, the object wave is distorted due to scattering properties of the turbid media. The distorted object wave is acquired by the image acquisition device 6 as the signal beam 4. The distorted object wave is represented by Equation 2:

$$y(x, y) = \sum_{k_x} \sum_{k_y} a(k_x, k_y) t(x, y; k_x, k_y) + n(x, y)$$

where y(x,y) is an object wave distorted on a propagation route; a($k_x$, $k_y$) is an angular spectrum of the object wave; t(x, y; $k_x$, $k_y$) is a response wave after a certain P(x, y; k) (plane wave having k propagation directions) passes through the turbid media and may denote each column of the transmission matrix; and n(x,y) is noise. FIG. 5 is a view illustrating the transmission matrix. Referring to FIG. 5, each column of a transmission matrix for plane waves having k propagation directions is designated by t, and the transmission matrix is designated by T and stored in the transmission matrix storage unit 62. Although FIG. 5 shows only intensity information, phase information may also be acquired using a holographic process in which the signal beam is compared with the reference beam. Thus, information on each element of a column of the transmission matrix may be represented by a complex number.

Equation 2 may be expressed in vector notation by Equation 3:

$$y = Ta + n$$

where y is a vector expression of the distorted object wave; a is a vector expression of an angular spectrum of the object wave; T is a transmission matrix (wherein each column of the transmission matrix is a vector expression of the response wave); and n is a vector expression of noise. Here, the number of k's may be the number of columns of a transmission matrix acquired using the multidirectional lamp 20.

In Equation 3, since y is information acquired by the image sensor 61 and T is information acquired through measurement of the transmission matrix, it is possible to calculate the angular spectrum (a) of the object wave. When the angular spectrum is properly calculated, it is possible to reconstruct the object wave, i.e. an image entering the turbid media 1 according to Equation 1 based on the known P(x, y; $k_x$, $k_y$) (plane wave having k propagation direction).

Figure 4:
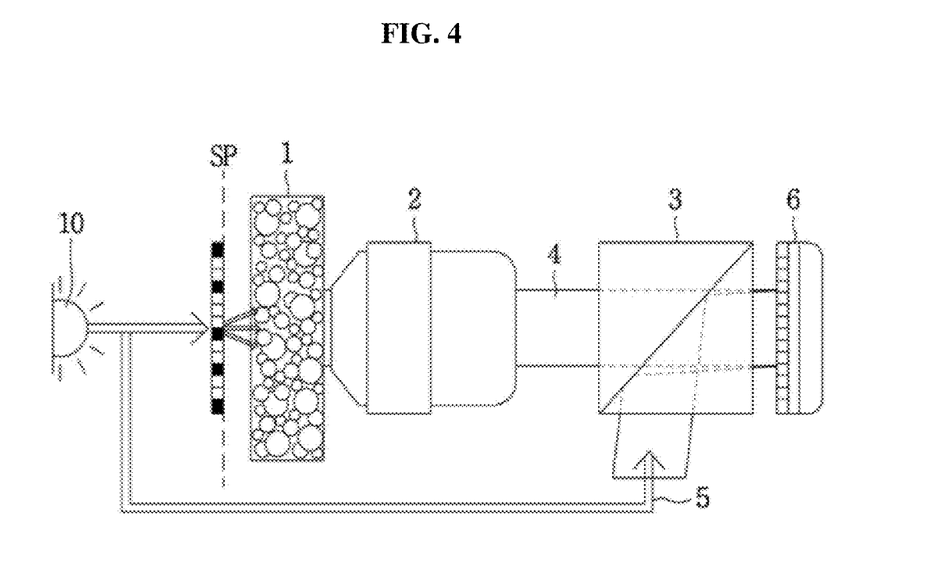
FIG. 4 is a view of the microscope according to the embodiment of the present invention in use.

FIG. 4 is a view of the microscope according to the embodiment of the present invention in use.

Referring to FIG. 4, a portion of light emitted from the light source 10 is transmitted through a sample to contain information such as a shape and form of the sample and then enters the light entrance portion of the lens system 2 through the turbid media 1. Another portion of light emitted from the light source 10 is bypassed by a separate light division device (not shown) such as a beam splitter and then enters the beam splitter (3) as a reference beam 5. Since light emitted from the light source 10 is coherent light, it is possible to obtain intensity (amplitude) and phase information from the data acquired by the image sensor. A typical example of the light source 10 may be a laser, preferably an infrared laser, which is harmless to the human body. Use of such a coherent light source can allow image accuracy to be more than doubled as compared with use of an incoherent light source, which is unable to obtain phase information. Thus, as the light source, a coherent light source is preferred. If an incoherent light source is used, the beam splitter 3, the reference beam 5, and a complex number expression for utilizing phase information are unnecessary since the holographic process is not employed.

Although a coherent light source is used to improve image accuracy in this embodiment, the present invention does not exclude use of an incoherent light source. However, it should be understood that use of a coherent light source and provision of the beam splitter 3 and the reference beam 5 are more preferable.

Figure 6:
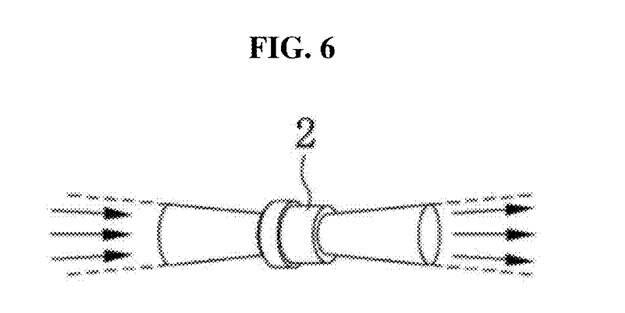
FIGS. 6 and 7 are reference views of an advantage of turbid media.
Figure 7:
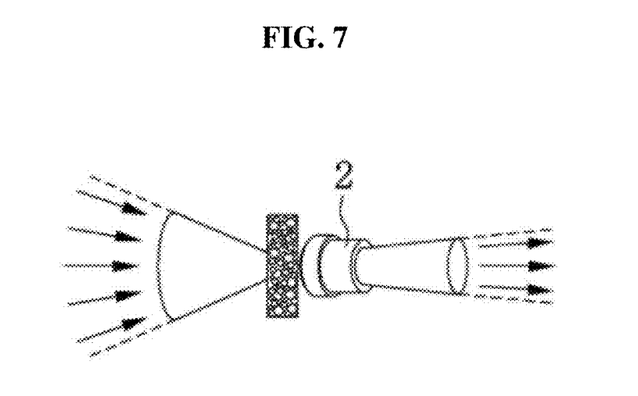

As described above, the turbid media 1 can increase a numerical aperture of the light entrance portion of the lens system 2. FIGS. 6 and 7 are reference views illustrating an advantage of the turbid media. The view of FIG. 6 shows the case in which the turbid media is absent, and the view of FIG. 7 shows the case in which the turbid media is provided to the light entrance portion of the lens system.

Referring to FIGS. 6 and 7, when the turbid media is provided, information can enter the lens system at an angle that would not otherwise allow entry into the light entrance portion of the lens system due to increase in the numerical aperture of the lens system. This is because light passing through the turbid media 1 can be scattered by the fine particles to enter the light entrance portion of the lens system. Thus, a lot more mixed information can be obtained for a given amount of light passing through the lens system 2. In other words, information that could not enter the lens system without the turbid media 1 can also be transmitted into the lens system, whereby a more accurate image can be recovered using the information.

Next, an advantage of the turbid media will be described in more detail. Firstly, output mode signals at the light exiting portion of the lens system 2 include all input-mode information entering the light entrance portion of the lens system 2. Secondly, a linear combination of input mode signals, that is, signals passing through the lens system in a transmission mode, is linearly independent from or does not have a correlation with linear combinations of signals transmitted in other transmission modes. Thus, the transmission mode of the lens system can be used in the most efficient manner Herein, the transmission mode may refer to a pixel or a fine area of an image By way of example, in a lens system that has three transmission modes, i.e. first, second, and third transmission modes without turbid media, A, B, and C input-mode signals are transmitted in the transmission modes, respectively. Conversely, when such a lens system is provided with turbid media, D and E input-mode signals that could not otherwise enter the lens system can be input to the lens system and each of A, B, C, D, and E input-mode signals can be transmitted through the lens system in any one of the first, second, and third transmission modes, each of which is present in the form of a mixture of at least two of transmission modes for A, B, C, D, and E input-mode signals.

From the above description, advantages of the microscope including the turbid media according to the present invention will become apparent.

Next, a process of finding an angular spectrum of the object wave will be described with reference to Equation 3. Equation 3 is an underdetermined system and a solution thereof can be found through an optimization process. In one embodiment, the solution of Equation 3 is found by compressed sensing using a sparse representation.

In order to successfully perform compressed sensing using a sparse representation, two requirements must be satisfied.

Firstly, the angular spectrum (a) of the object wave in Equation 3 must be a compressible signal. Herein, the term "compressible" means that the angular spectrum (a) of the object wave has a small number of nonzero elements. Images of the natural world including an image of an object to be observed under a microscope can be expressed by a small number of elements in a wavelet domain. Further, it is known that when an image can be expressed by a small number of elements even in an orthogonal signal base other than a wavelet domain, signals of the image are compressible.

Specifically, this is known through: M. Aharon, M. Elad, and A. Bruckstein, "K-SVD: an algorithm for designing overcomplete dictionaries for sparse representation," IEEE Trans. Signal processing. 54, 4311-4322 (2006); and E. J. Candes and T. Tao, "Near-optimal signal recovery from random projections: universal encoding strategies," IEEE Trans. Inf. Theory. 52, 5406-5425 (2006).

Secondly, the transmission matrix T in Equation 3 must be incoherent. In compressed sensing, the transmission matrix T is obtained by measuring characteristics of the turbid media 1 and thus may be referred to as a measurement matrix. When columns of the transmission matrix have low cross-correlation with one another, the transmission matrix can be said to be incoherent. Each of the columns of the transmission matrix is a measurement value of each of light components emitted in different directions by the multidirectional lamp 20. Since the measurement value changes randomly when the light beams pass though the turbid media 1, it can be ensured that the transmission matrix is incoherent.

From the above description, it can be confirmed that an optimal solution of the underdetermined system represented by Equation 3 can be found by compressed sensing using a sparse representation. A method of finding the optimal solution through compressed sensing using a sparse representation is represented by Equation 4:

$$\hat{a}_{SSE} = \underset{a}{\operatorname{argmin}} \|a\|_1 \text{ subject to } y = Ta$$

wherein a subscript sse denotes sparse signal estimation; and $\|\cdot\|_1$ is an L1-norm and denotes the sum of absolute values of vector elements.

An optimal solution of Equation 4 can be found by simplex methods, steepest decent methods, or second derivative methods. By way of another example, the optimal solution can be found by an L1-norm minimizing method disclosed in Korean Patent No. 10-1423964 of the present applicant.

When the angular spectrum of the object wave is calculated according to Equation 4, an image can be recovered by the method described in Equation 3.

Next, a specific embodiment of the microscope and results of testing according to the embodiment will be described with reference to the above features.

First, the turbid media 1 obtained by incorporating nanoparticles of nanoscale zinc oxide (ZnO) into a transparent resin were deposited on a slide glass disposed between a sample plane (SP) and an object lens of the lens system 2. An observation object was irradiated with laser beams at 633 nm using the multidirectional lamp 20, the direction of which is adjusted by a galvanometer, thereby obtaining a transmission matrix. Here, as the object, a sample similar to a USAF target was used.

Next, results of a test in which compressed sensing using a sparse representation was conducted will be described along with comparative examples.

Figure 8:
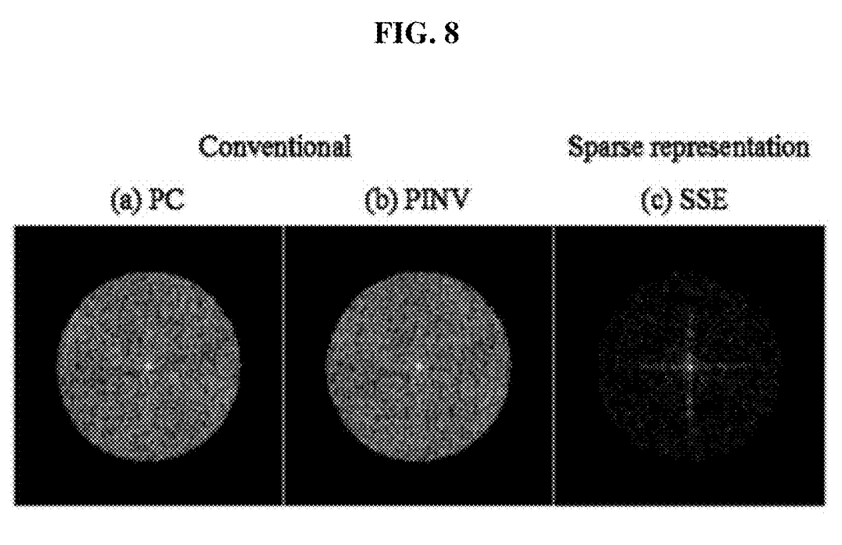
FIG. 8 shows results of a test in which, using 20,000 columns of the transmission matrix, an angular spectrum of an object wave was calculated by compressed sensing using a sparse representation (SSE) according to the embodiment of the invention, an inverse matrix operator (phase conjugation (PC)), and a pseudo inversion method (PINV)

FIG. 8 shows results of a test in which, using 20,000 columns of the transmission matrix, an angular spectrum of the object wave was calculated by compressed sensing using a sparse representation (SSE) according to the embodiment of the invention, an inverse matrix operator (phase conjugation (PC)), and a pseudo inversion method (PINV).

Referring to FIG. 8, it can be seen that speckling of the obtained image was considerably reduced when compressed sensing using a sparse representation was employed.

Figure 9:
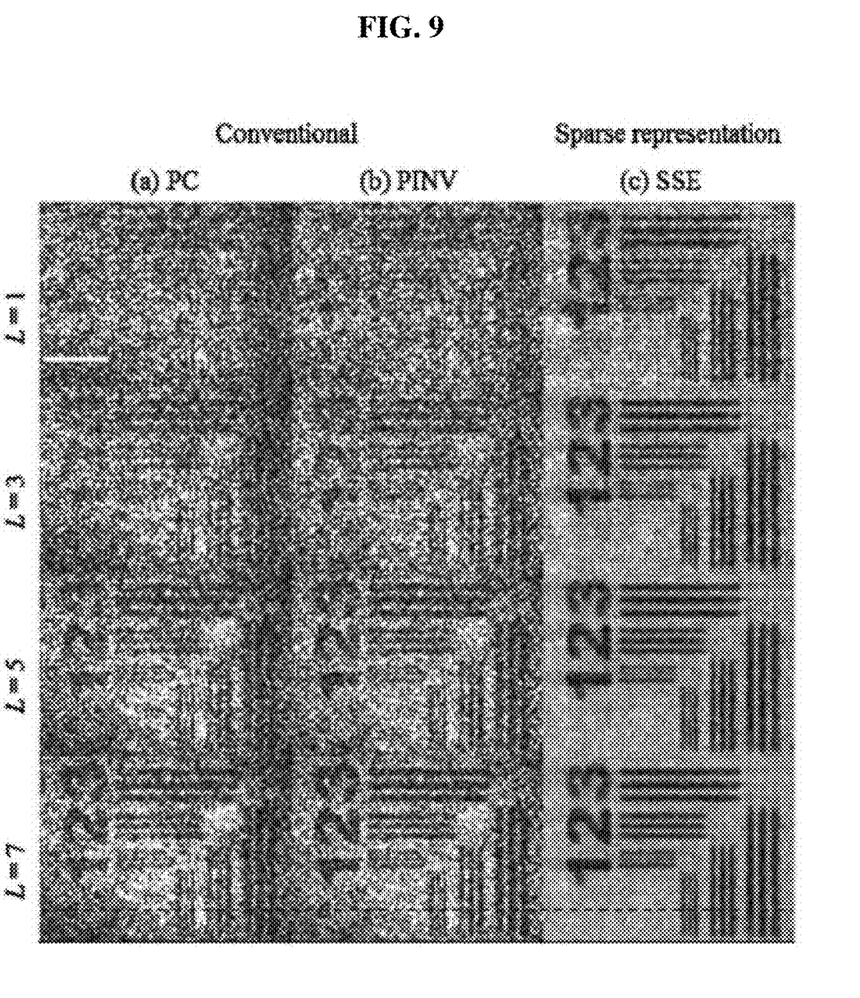
FIG. 9 shows images obtained by a test in which, using 20,000 columns of the transmission matrix, compressed sensing using a sparse representation (SSE) according to the embodiment of the invention, an inverse matrix operator (phase conjugation (PC)), and a pseudo inversion method (PINV) were performed while varying the number of image averaging operations L with an independent sample.

FIG. 9 shows images obtained by a test in which, using 20,000 columns of the transmission matrix, compressed sensing using a sparse representation (SSE) according to the embodiment of the invention, an inverse matrix operator (phase conjugation (PC)), and a pseudo inversion method (PINV) were performed while varying the number of image averaging operations L with an independent sample.

Referring to FIG. 9, it can be seen that, when compressed sensing using a sparse representation was employed, the obtained image had few or no speckles through 7 image averaging operations and image reconstruction could be achieved to a certain level without image averaging. Conversely, it can be seen that, in the case of employing an inverse matrix operator (phase conjugation (PC)) and a pseudo inversion method (PINV), the image suffered from severe speckling and was nearly unrecognizable.

Figure 10:
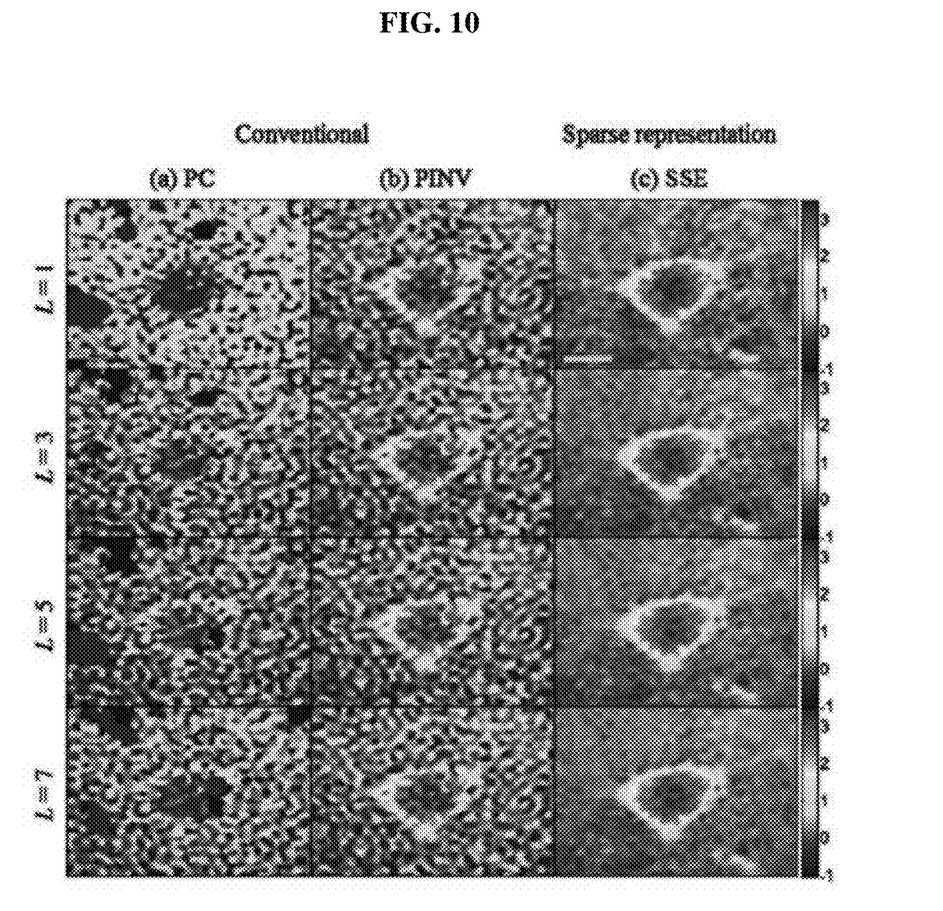
FIG. 10 shows images obtained by a test in which, using 5,000 columns of the transmission matrix, compressed sensing using a sparse representation (SSE) according to the embodiment of the invention, an inverse matrix operator (phase conjugation (PC)), and a pseudo inversion method (PINV) were performed to acquire an image of brain cells of a living rat having a size of 450 μm while varying the number of image averaging operations L with an independent sample.

FIG. 10 shows images obtained by a test in which, using 5,000 columns of the transmission matrix, compressed sensing using a sparse representation (SSE) according to the embodiment of the invention, an inverse matrix operator (phase conjugation (PC)), and a pseudo inversion method (PINV) were performed to acquire an image of brain cells of a living rat having a size of 450 μm while varying the number of image averaging operations L with an independent sample.

Referring to FIG. 10, it can be seen that, when compressed sensing using a sparse representation was employed, speckling of the obtained image was considerably reduced.

The present invention can provide a microscope which can improve image resolution.

In addition, according to the present invention, it is possible to provide a microscope which can reduce the number of samples required for image recovery to reduce time complexity while allowing dynamic characteristics of a specimen to be discerned in a shorter time. Further, it is possible to provide a microscope which can reduce memory complexity, thereby allowing a behavior pattern of a specimen to be observed for a longer period of time.

Although the present invention has been described with reference to some embodiments, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention.

What is claimed is:

1. A microscope comprising:
    a lens system receiving light emitted from a light source and containing image information of an observation object;
    a turbid media interposed between the observation object and the lens system; and
    an image acquisition device acquiring the image information, wherein the image acquisition device comprises:
        an image sensor acquiring information of light passing through the lens system;
        a memory configured to store a transmission matrix indicating a transmission state of various light components entering the light entrance portion; and
        a processor configured to recover the image information from the information of light acquired by the image sensor through compressed sensing using a sparse representation based on the transmission matrix.

2. The microscope according to claim 1, wherein the light source is a coherent light source.

3. The microscope according to claim 2, wherein the light source is an infrared laser.

4. The microscope according to claim 1, wherein a beam splitter is disposed between the image acquisition device and the lens system, and allows both a signal beam passing through the lens system and a reference beam emitted from the light source to be transmitted to the image sensor.

5. The microscope according to claim 1, wherein the turbid media are obtained by incorporating nanoscale fine particles into a transparent matrix.

6. The microscope according to claim 5, wherein the fine particles are formed of ZnO.

7. The microscope according to claim 1, wherein the turbid media is deposited on a slide glass.

8. The microscope according to claim 1, wherein columns of the transmission matrix are calculated at different light incident angles.

9. A microscope comprising:
    a lens system;
    turbid media interposed between the lens system and an observation object; and
    an image acquisition device acquiring an image of the observation object from light passing through the lens system, wherein the image acquisition device comprises:
        an image sensor acquiring information of light passing through the lens system;
        a memory configured to store a transmission matrix indicating a transmission state of light components passing through the lens system at different incident angles; and
        a processor configured to recover an image of the observation object from the information of light acquired by the image sensor through compressed sensing using a sparse representation based on the transmission matrix.

10. A microscope comprising:
    a light source configured to generate a signal beam and a reference beam;
    a turbid media in a path of the signal beam downstream of a sample to be observed;
    a lens system configured to receive the signal beam downstream of the turbid media;
    an image acquisition device configured to acquire an image of the sample, wherein the image acquisition device comprises:
        an image sensor configured to receive the signal beam that past the sample and the turbid media, and the reference beam;
        a memory configured to store a transmission matrix of the microscope, wherein the transmission matrix corresponds to a transmission state of various light components entering the image sensor through the turbid media; and
        a processor configured to reconstruct the image of the sample using the signal beam and the reference beam acquired by the image sensor, wherein the reconstruction of the image is based on compressed sensing using a sparse representation, and the compressed sensing is based on the transmission matrix stored in the memory.

* * * * *